US010459538B2

(12) United States Patent
Peretz et al.

(10) Patent No.: US 10,459,538 B2
(45) Date of Patent: Oct. 29, 2019

(54) PRESSURE SENSITIVE STYLUS

(71) Applicant: Microsoft Technology Licensing, LLC, Redmond, WA (US)

(72) Inventors: Ahia Peretz, Ramat Gan (IL); Vadim Mishalov, Tel Aviv (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 95 days.

(21) Appl. No.: 15/595,598

(22) Filed: May 15, 2017

(65) Prior Publication Data

US 2018/0329526 A1 Nov. 15, 2018

(51) Int. Cl.
| | |
|---|---|
| *G06F 3/0354* | (2013.01) |
| *G06F 3/041* | (2006.01) |
| *G06F 3/044* | (2006.01) |
| *G06F 3/038* | (2013.01) |

(52) U.S. Cl.
CPC ........ *G06F 3/03545* (2013.01); *G06F 3/0383* (2013.01); *G06F 3/044* (2013.01); *G06F 3/0412* (2013.01); *G06F 3/0414* (2013.01); *G06F 2203/04101* (2013.01); *G06F 2203/04105* (2013.01)

(58) Field of Classification Search
CPC .. G06F 3/03545; G06F 3/0412; G06F 3/0414; G06F 3/044; G06F 2203/04101; G06F 2203/04105
See application file for complete search history.

(56) References Cited

U.S. PATENT DOCUMENTS

| | | |
|---|---|---|
| 3,856,536 A | 12/1974 | Siegelman et al. |
| 4,111,052 A | 9/1978 | Sniderman |
| 4,142,175 A | 2/1979 | Herbst et al. |
| 5,004,872 A | 4/1991 | Lasley |
| 5,040,306 A | 8/1991 | McMurtry et al. |
| 5,488,204 A | 1/1996 | Mead et al. |
| 5,548,092 A | 8/1996 | Shriver |

(Continued)

FOREIGN PATENT DOCUMENTS

| | | |
|---|---|---|
| EP | 2365424 A2 | 9/2011 |
| EP | 3101513 A1 | 12/2016 |

OTHER PUBLICATIONS

Annett, et al., "Hands, Hover, and Nibs: Understanding Stylus Accuracy on Tablets", In Proceedings of the 41st Graphics Interface Conference, Jun. 3, 2015, pp. 203-210.

(Continued)

*Primary Examiner* — Afroza Chowdhury
(74) *Attorney, Agent, or Firm* — Holzer Patel Drennan

(57) ABSTRACT

A stylus device includes circuitry that includes hardware and/or software for detecting force applied to a tip of the stylus device and communicating the detected force to a host device. The detected force may be represented by a signal generated as a function of capacitance. A force response circuit modifies a force dependent capacitive response by increasing the force dependent capacitive response in a low force range relative to a high force range. A signal is generated based on the modified force dependent capacitive response and communicated to a host device or other communications transceiver of the host device. The host device generates digital ink with a weight (e.g., thickness) dependent on the detected force.

20 Claims, 5 Drawing Sheets

(56) References Cited

U.S. PATENT DOCUMENTS

| | | | |
|---|---|---|---|
| 5,635,683 A | 6/1997 | McDermott et al. | |
| 5,959,613 A | 9/1999 | Rosenberg et al. | |
| 7,202,862 B1 | 4/2007 | Paley et al. | |
| 7,436,397 B2 | 10/2008 | Zank | |
| 8,536,471 B2 * | 9/2013 | Stern | G06F 3/03545 178/19.04 |
| 9,176,604 B2 | 11/2015 | Krah et al. | |
| 9,218,073 B1 | 12/2015 | Kremin et al. | |
| 9,500,552 B2 | 11/2016 | Williams | |
| 9,542,014 B1 | 1/2017 | Sundara-Rajan | |
| 9,841,828 B2 | 12/2017 | Peretz et al. | |
| 2008/0106520 A1 | 5/2008 | Free et al. | |
| 2010/0051356 A1 | 3/2010 | Stern et al. | |
| 2015/0116289 A1 * | 4/2015 | Stern | G06F 3/03545 345/179 |
| 2015/0138128 A1 | 5/2015 | Herrick et al. | |
| 2015/0277596 A1 | 10/2015 | Hoffman et al. | |
| 2015/0324018 A1 | 11/2015 | Hinson | |
| 2016/0109965 A1 * | 4/2016 | Chan | G06F 3/03545 345/179 |
| 2016/0239106 A1 | 8/2016 | Ballan et al. | |
| 2016/0306444 A1 | 10/2016 | Fleck | |
| 2018/0232068 A1 * | 8/2018 | Gordon | G06F 3/03545 |

OTHER PUBLICATIONS

Shams, et al., "A Monolithic Opto-Coupler Based Sensor for Contact Force Detection in Artificial Hand", In Proceedings of 2nd International Conference on Robotics and Artificial Intelligence, Nov. 2016, pp. 186-189.

Kim, et al., "Does Human Finger's Pressure Sensing Improve User Text Input on Mobile Device? A Study on Input Performance Improvement Based on Human Finger's Pressure on Mobile Device", In Proceedings of International Journal of Distributed Sensor Networks, Jul. 20, 2014, 10 Pages.

"International Search Report and Written Opinion Issued in PCT Application No. PCT/US18/026625", dated Jul. 11, 2018, 12 Pages.

"International Search Report and Written Opinion Issued in PCT Application No. PCT/US18/028728", dated Jul. 24, 2018, 14 Pages.

"Non-Final Office Action Issued in U.S. Appl. No. 15/499,630", dated Nov. 16, 2018, 11 Pages.

* cited by examiner

PRESSURE SENSITIVE STYLUS

BACKGROUND

Electronic devices, especially tablets or smart phones, may accept input via hand-held peripheral devices, such as a stylus. A stylus may be held manually by a user in relation to a screen to provide input to the electronic device. The stylus may employ sensors to measure the amount of force applied by the user at the tip of the stylus against a surface (e.g., screen) of the electronic device. The measured amount of force may be communicated to the electronic device (e.g., tablet) and utilized by the electronic device to display a digital ink whose weight (e.g., thickness) depends on the detected force.

A stylus can be classified as a passive stylus or an active stylus. The passive stylus utilizes sensing methods based on changes in the capacitive coupling between sensor electrodes deposited on a touch-screen sensor and an input object, such as a rubber-tipped stylus or figure. In contrast, active styluses drive unique modulated signals between the tip of the stylus to a grid of electrodes (e.g., a digitizer) and utilize sensing methods based on changes in the capacitive coupling between sensor electrodes. Both active and passive styluses may communicate detected pressure information to the electronic devices (e.g., the host device) for digital ink weighting.

SUMMARY

A stylus device includes a force response circuit configured to modify a force dependent capacitive response in a capacitive force sensor such that the force dependent capacitive response is more sensitive to a detected force in a low force range relative to a higher force range. The force dependent capacitive response is dependent on the detected force applied to a tip of the stylus device. The stylus device further includes an inking circuit communicatively connected to the capacitive force sensor that generates an inking signal for communication to a host device. The generated inking signal is based on the modified force dependent capacitive response and representing the detected force applied to the tip.

A method includes modifying a force dependent capacitive response in a capacitive force sensor such that the force dependent capacitive response is more sensitive to a detected force in a low force range relative to a higher force range. The force dependent capacitive response is dependent on the detected force applied to a tip of the stylus device. The method further includes generating an inking signal for communication to a host device. The generated inking signal is based on the modified force dependent capacitive response and representing the detected force applied to the tip.

A system includes an inking circuit communicatively connected to the capacitive force sensor that generates an inking signal for communication to a host device. The generated inking signal is based on the modified force dependent capacitive response and representing the detected force applied to the tip. The system further includes an inking circuit communicatively connected to the capacitive force sensor that generates an inking signal for communication to a host device. The generated inking signal is based on the modified force dependent capacitive response and representing the detected force applied to the tip.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other implementations are also described and recited herein.

BRIEF DESCRIPTIONS OF THE DRAWINGS

DETAILED DESCRIPTIONS

Figure 1:
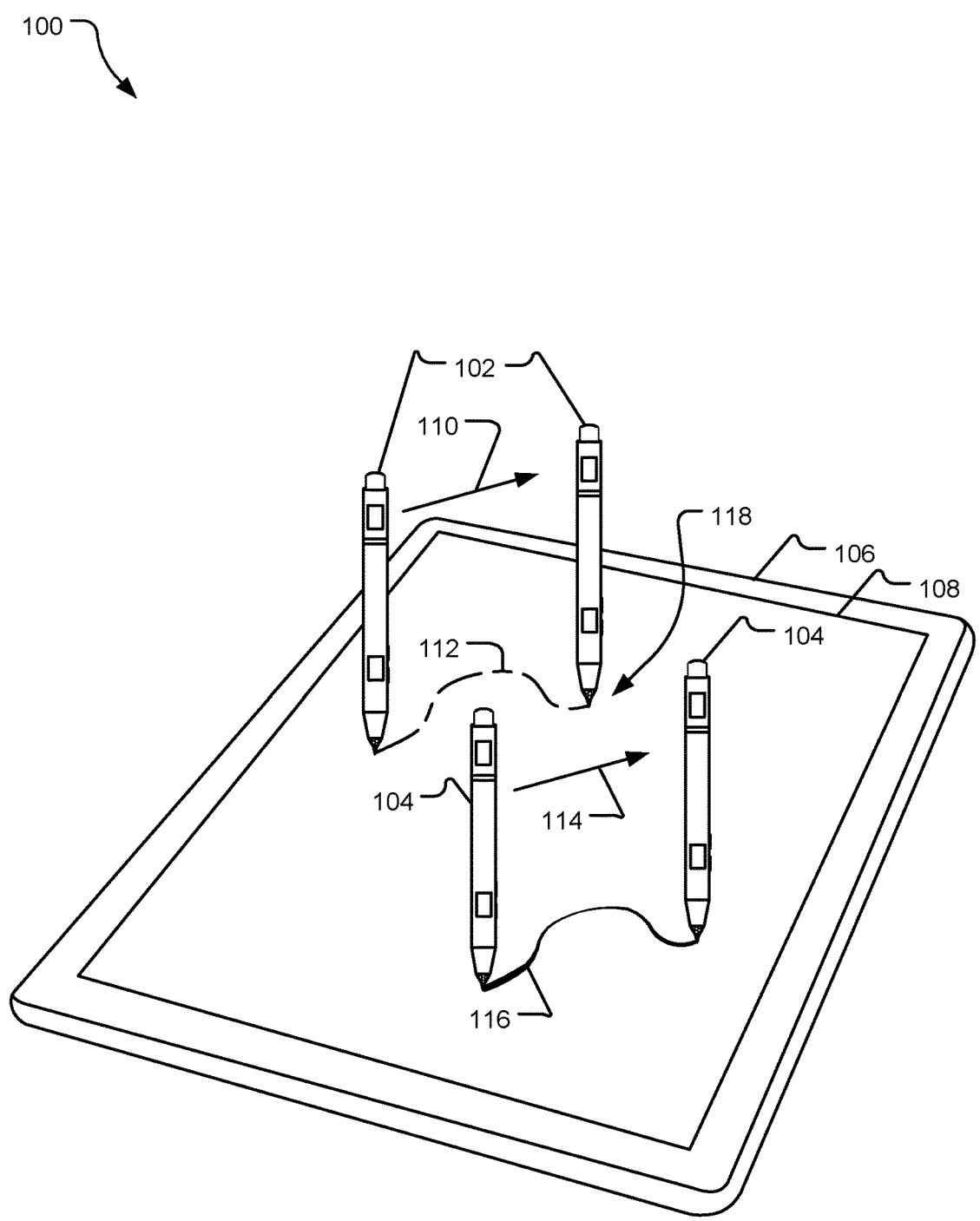
FIG. 1 illustrates an example system including stylus devices and a host device.

A hand-held stylus peripheral ("stylus device") for use with electronic devices, including smart phones, tablets, watches, desktop computers, gaming devices, wearable device, televisions, video conferencing systems, etc. may be equipped with a force sensor for measuring a force applied to the tip. The stylus device may communicate user input to an electronic device ("host device"). Some host devices include a display with a built-in digitizer to sense signals transmitted from the stylus device (e.g., an "active stylus"). In these electronic devices, a user interacts with the digitizer system by positioning and moving the stylus device over a sensing surface of the system, e.g., a tablet and/or a touch screen. The position of the stylus device with respect to the sensing surface is tracked by the digitizer system and interpreted as a user command. In some technologies, position of the stylus device can be determined based on detection of capacitive coupling between an electrode of the stylus device and one or more electrodes of the digitizer. For example, the device display may include a digitizer with a plurality of X and Y oriented conductors or a resistive film to receive signals transmitted from the electrode of the stylus device. To accurately identify tip position, the transmitting electrode is, in some technologies, physically positioned within a writing tip of the stylus device. Active stylus devices may generate a modulated signal that may be detectable by the digitizer. The signal may be encoded with information such as the device identification, operational mode (e.g., writing, erasing), pressure information, tilt information, and other information. The information may be allocated to various portions of the signal.

The passive stylus utilizes sensing methods based on changes in the capacitive coupling between sensor electrodes deposited on a touch-screen sensor and an input object, such as a rubber-tipped stylus or figure. In such implementations, the passive stylus may communicate detected pressure information to the host device using communication protocols such as Wi-Fi, Bluetooth, etc.

Such information (e.g., pressure information) is detectable by the host system (e.g., tablet, smart phone) and used to provide functionality in the display of the host system. For example, the host device detects a stylus that is in writing mode with identifiable pressure information. The host system can use that information (in combination with position information detected through the digitizer) to display digital ink with the thickness dependent on the pressure information encoded in the signal. For example, a light touch may indicate a relatively finer line should be draw on the device. As the user increases pressure on the stylus, the weight of the line may increase accordingly. The stylus device may therefore detect a binary condition indicating whether the stylus should draw or hover, and, in an ink mode, detect a pressure to indicate the weight of a line to be drawn.

Capacitive force sensors used to detect pressure in stylus devices detect differences in force detection between for example, 300 and 350 grams of force applied. Furthermore, capacitive force sensors detect when the force applied reaches an inking activation threshold such as, for example, 25 grams or less.

Implementations described herein provide a force response circuit that modifies a force dependent capacitive response in a capacitive force sensor such that the force dependent capacitive response is more sensitive to a detected force in a low force range relative to a high force range. The force response circuit may be communicatively connected to the capacitive force sensor, may be built in to the capacitive force sensor, etc. The force response circuit uses one or more capacitors in series to increase the force sensitivity capacitive response. As a result, the stylus device accurately detects force differences in a range from zero to ten grams of force, for example. Similarly, the activation force of the stylus device to vary from a hover mode to an inking mode may be set to a low force such as two grams, for example. Thus, the stylus device is ideal for use by humans, who sense force differences (e.g., one gram differences) in a low force range (e.g., zero to thirty grams) better than a higher force range (e.g., above 300 grams). For example, humans are barely able to sense a difference between 300 and 350 grams of applied force, but humans are able to sense a difference between five grams and six grams. In some example implementations, a sensitivity of the force dependent capacitive response is increased in a force sub-range of the overall force range detectable by the capacitive force sensor. For example, if the capacitive force sensor of a stylus device is able to detect forces between 0 to 400 grams, the force dependent capacitive response sensitivity may be increased in a sub-range from 50 to 100 grams, for example. It should be understood that this force sub-range may be configurable by a user, during production, etc. and that other ranges and sub-ranges are contemplated.

FIG. 1 illustrates an example system 100 including stylus devices 102 and 104 and a host device 106. The host device 106 includes a display 108 that may be integrated with a digitizer sensor (not shown). Specifically, FIG. 1 illustrates the stylus device 102 that is not configured with a force response circuit described herein and the stylus device 104 that is configured with a force response circuit (not shown) described herein.

Each of the stylus devices 102 and 104 are configured with a capacitive force sensor that detects force applied to tips of the stylus devices 102 and 104. For example, the stylus device 102 includes a capacitive force sensor (not shown) that detects force applied to a tip. The user may hold the stylus device above the display 108 of the host device 106 and apply the stylus device 102 to the display 108 of the host device 106 such as to generate digital ink on the display 108 of the host device. The stylus device 102 (and 104) may include multiple modes of operation such as a hover mode and an inking mode. When no (or near zero) force is detected at the tip 118 of the stylus device 102, the stylus device 102 emits a signal encoding the operational mode (e.g., hover) detectable by the digitizer of the host device. In some implementations, such as those with a passive stylus, the emitted signal is a BlueTooth or other type of signal detect-able by the host device. When the stylus device 102 senses enough force (e.g., an activation force) applied to the tip 118, the stylus device 102 may change from a hover mode to an inking mode, and alter the emitted signal accordingly. The stylus device 102 may sense increasing force and transmit a signal indicating the received force level to the digitizer (or another communications transceiver) of the host device 106. The digitizer of the host device 106 senses the location of the emitted signal and force information encoded in the signal to generate digital ink in the detected location. The host device 106 generates ink with varying weights depending on the amount of pressure applied to a tip 118 of the stylus device 102.

As described above, the stylus device 102 is not equipped with a force response circuit described herein. As illustrated by the movement (e.g., illustrated by an arrow 110) and an ink response (e.g., illustrated by an inking line 112) generated on the host device 106, the stylus device 102 has issues with detecting varying force applied to the stylus device 102. As illustrated, the inking line 112 includes dots and inconsistent inking because of failure of the stylus device to detect differences in forces applied to the tip 118 at low force ranges (e.g., between 0 and 10 grams of force applied to the tip 118). Because the stylus device 102 is inaccurate at detecting force differences at low force ranges, the stylus device 102 may not be ideal for use in some applications requiring sensitive force detection (e.g., a drawing application). Furthermore, the activation force in the stylus device may be set to a higher force (e.g., 50 grams) because the inaccuracy of force detection at a lower force range. As such, the user may be trying to ink using a lighter weight (e.g., a thin line), but is having trouble keeping the applied force above the activation force but at a light force to cause lighter inking weight. Such behavior may cause the inconsistent inking illustrated by the inking line 112.

In contrast, the stylus device 104 includes a force response circuit (not shown). When force is applied to the stylus device 104 and the stylus device 104 is moved (illustrated by an arrow 114), an ink response is generated (illustrated by an inking line 116). The ink response illustrates varying line thickness dependent on the varying low levels of applied force (e.g., between 0 and 10 grams). The force response circuit increases the sensitivity of force detection in low force ranges. As such, the stylus device 104 is usable in applications requiring increased sensitivity in low force ranges, which may now be referred to as the sensitive low force range. Furthermore, an activation force to change from hover mode to inking mode may be set to a lower force such as two grams, for example. Because humans are able to accurately sense differences in forces at lower force ranges, a user may apply enough pressure to meet the activation force while accurately changing the applied force to change the inking weight. In some example implementations, the force response circuit of the stylus device 104 increases sensitivity of a force sub-range (e.g., 10-30 grams) of an overall force range detectable by the stylus device 104 (e.g., 0-400 grams). It should be understood that the force response circuit may be configurable during production, by a user based on a user preference, changes based on a force range, etc.

Figure 2:
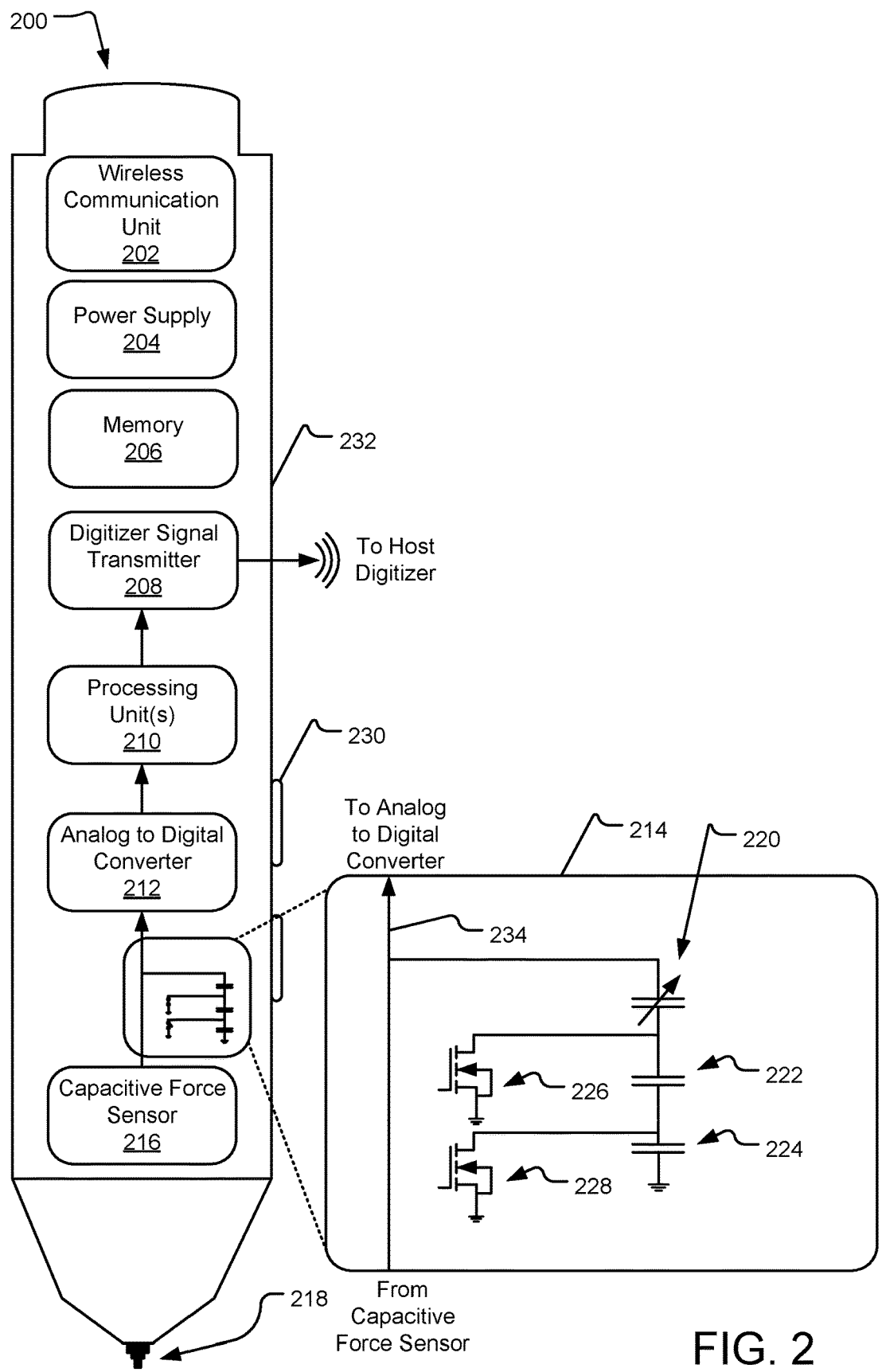
FIG. 2 illustrates an example block diagram of an example stylus device.

FIG. 2 illustrates an example block diagram of an example stylus device 200. The stylus device 200 includes a wireless communication unit 202. The wireless communication unit 202 is configured to communicate with one or more host devices via BlueTooth, Wi-Fi, near-field communication, etc. The wireless communication unit 202 may include a receiver to receive communication commands, pairing requests, etc. from the host device. The stylus device 200 includes a power supply 204, which may comprise a battery for powering the various components of the stylus device 200. The battery may be rechargeable, replaceable, disposable, etc. In some implementations, the stylus device is a wired to a host device by, for example, a Universal Serial Bus (USB) connection and communicates with the host device via such a connection.

The stylus device may further include a memory 206 for onboard storage of user files, user specifications, etc. The memory 206 may be a tangible processor-readable storage and may store processor readable instructions for communication and digital inking through a host device. The stylus device may include a display (not shown) that may display to the user any of the following: the power status of the battery, the current wireless signal strength, or other information relating to an electronic device configured to receive user input from the stylus.

The stylus device 200 further includes a digitizer signal transmitter 208, one or more processing units 210, an analog to digital converter 212, a force response circuit 214, and a capacitive force sensor 216, which may collectively be referred to as the inking system. The inking system may include other components such as a sampler. The inking system detects pressure applied to a stylus tip 218, increases force sensitivity, converts the detected force to a digitizer signal and communicates the digitizer to the host device for digital inking. Specifically, the capacitive force sensor 216 detects a force applied to the stylus tip 218. The capacitive force sensor may be a fluid pressure force sensor, resistive force sensor, or any other type of capacitive sensor that detects force applied to the stylus tip 218 and outputs a force dependent capacitive response representing the detected force. The signal output by the capacitive force sensor may be a voltage, from which a capacitance may be derived. Such a derived capacitance may be a function of the detected force. In some implementations, the derived capacitance from the capacitive force sensor is not suitable in certain force ranges. For example, between zero and ten grams applied to the stylus tip 218, the capacitive force sensor 216 may not be able to discern or represent differences. The capacitive response of a two-gram force applied to the stylus tip 218 and the capacitive response of a six-gram force applied to the stylus tip 218 may not be discernably different. In some implementations, the capacitance response in such different forces may be too noisy to discern a difference in the applied force.

Accordingly, the force response circuit 214 is provided to increase the sensitivity of the force dependent capacitive response in selected force ranges. The force response circuit includes a plurality of capacitors in series. A variable capacitor 220 is followed by a capacitor 222 and a capacitor 224. The capacitors are communicatively connected to metal-oxide-semiconductor field-effect transistors (MOSFETs) 226 and 228, which are connected to ground. The MOSFETS 226 and 228 calibrate the series capacitance during production. The force response circuit 214 may be implemented in a variety of ways such as a discrete circuit or part of a micro-processing unit. Similarly, the capacitive force sensor 216, the force response circuit 214, the analog to digital converter 212, and the processing unit(s) 210, and other systems such as a sampler may be implemented in an application specific integrated circuit (ASIC), system on chip (SOC), micro-processing unit (MU), etc. Furthermore, the force response circuit 214 may be a part of the capacitive force sensor 216.

The force response circuit 214 is connected to a signal path 234 that communicates the signal (e.g., a force dependent capacitive response) from the capacitive force sensor 216 to the analog to digital converter 212. It should be understood that the force response circuit 214 illustrated in FIG. 2 is one of many possible circuit configurations, and that other circuit configurations are contemplated for increasing the capacitance sensitivity in a force range. For example, the force response circuit 214 may include more than three capacitors in series and may include many capacitors. The force response circuit 214 is configured for gain control and offset compensation. In some implementations, the force response circuit 214 is agnostic to the type of the capacitive force sensor 216.

The signal representing force as a function of capacitance is communicated from the capacitive force sensor 216 to the analog to digital converter 212. The force response circuit 214 modifies the signal by increasing the capacitance sensitivity response in low force range of the signal relative to a higher force range in the signal. Because of the force response circuit 214, the signal reflects force in the lower force range more clearly than implementations without the force response circuit 214. Different values of the signal may represent, for example, two-grams of applied force and five-grams of applied force. The modified signal is converted to a digital signal by the analog to digital converter 212. The converted signal may be sampled to generate series of values that represent the applied force. The samples may then be encoded into a digitizer signal by the processing units 210. The digitizer signal is transmitted by the digitizer signal transmitter 208 to the digitizer of the host device. The host device detects location of the received signal and utilized the force in the signal to generate digital ink at the location with a weight (e.g., thickness) corresponding to the detected force.

In some example implementations, such as with a passive stylus, the detected force is communicated to the host device using another communications protocol (e.g., other than a digitizer signal) such as BlueTooth or Wi-Fi. The host device receives the signal with the encoded pressure information along with detected location (e.g., by detected capacitive changes on the display) to generate digital ink with weight dependent on the force.

The digitizer signal transmitter 208 may include one or more antennas for communicating the digitizer signal. The antennas may be configured inside the device, as a section of a stylus body 232 of the stylus device 200, as a clip (not shown), or in the stylus tip 218. As such, the digitizer signal is communicated to the antenna for transmission. In some example implementations, the digitizer signal and/or other signals may be communicated via the wireless communication unit 202. The digitizer signal transmitter 208, the processing units 210, the analog to digital converter 212, a sampler, and/or the wireless communications unit 202 may be collectively referred to as an inking circuit.

The stylus device 200 may include one or more buttons (e.g., a button 230) for changing operational modes of the stylus device. For example, when button 230 is depressed a signal communicated to the host device may inform the host device that the stylus device 200 is in an erasure mode. Furthermore, such operational modes may indicate a color of the digital ink, writing patterns (e.g., dotted lines), writing utensil (e.g., brush, pen, marker, pencil). Other operational modes are contemplated. The detected force may be indicated with the different operational modes. For example, when in erasure mode, the detected force may indicate an erasure thickness. The buttons may also be used to initiate device pairing with the host device.

Because the stylus device 200 is configured to more accurately detected force differences in lower force ranges, an activation force of the stylus device may be set to a low force such as, for example, two grams. The activation force is a force threshold that changes the stylus device from a hover mode to an inking mode. In other words, an activation force is a force that may be accurately detected and above which, changes in force may be accurately detected. A user using the stylus device 200 may satisfy the activation force and subtly alter the force applied to the stylus device to change the inking response.

In some example implementations, the force response circuit 214 is configured to increase the sensitivity of the force dependent capacitive response in a selected force range. For example, some circuits may increase the force dependent capacitive response sensitivity in a range from zero to ten grams, which may be ideal for some example users. Other circuits may be usable to increase the force dependent capacitive response sensitivity in a range from twenty to fifty grams, which may be ideal for other example users. As such, stylus devices with different sensitivities may be presented for different user preferences.

In some example implementations, the force response circuit 214 is configured to increase the sensitivity of the force dependent capacitive response in more than one force range. In such implementations, variable capacitors, such as variable capacitor 220, may be used to vary the force dependent capacitive response based on conditions. Such conditions may include, without limitation, a user (e.g., a user can use one or more buttons to select sensitivity), the applied force (e.g., at low applied force may cause circuit changes that increase the sensitivity of force dependent capacitive response in the low force range and a higher applied force may cause circuit changes that increase the sensitivity of the force dependent capacitive response in the high force range), etc. It should be understood that other electrical elements may be used to change the capacitance sensitivity.

In some example implementations, the user may configure, select, or train force sensitivity. For example, when pairing a stylus device with a host device, the stylus device (or host device) may initiate a force training process. Such a process may include a user "writing" on the host device and selectively configuring the force response based on displayed digital ink. Such configuration may include configuration of the force response circuit 214 by changing the capacitive response using the variable capacitor 220, etc.

The stylus device 200 may include one or more buttons (e.g., a button 230) for changing operational modes of the stylus device. For example, when button 230 is depressed a signal communicated to the host device may inform the host device that the stylus device 200 is in an erasure mode. Furthermore, such operational modes may indicate a color of the digital ink, writing patterns (e.g., dotted lines), writing utensil (e.g., brush, pen, marker, pencil). Other operational modes are contemplated. The detected force may be indicated with the different operational modes. For example, when in erasure mode, the detected force may indicate an erasure thickness. The buttons may also be used to initiate device pairing with the host device and wake up the stylus device 200 from a standby mode and/or activate menus and/or other user interface designs. The buttons may also be used to select or "click" an element on a graphical user interface displayed on a host device. The stylus device 200 may include on or more friction areas for facilitating the user's grip and manipulation, such as, for example, a rubber friction area or textured area to increase friction with a user/s hand and/or fingers.

In implementations, the stylus body 232 may be formed of a material suitable for enclosing the components described herein. The stylus body 232 may be formed from, for example without limitation, plastic, rubber, metal, carbon fiber, etc. and/or any combinations thereof.

Figure 3:
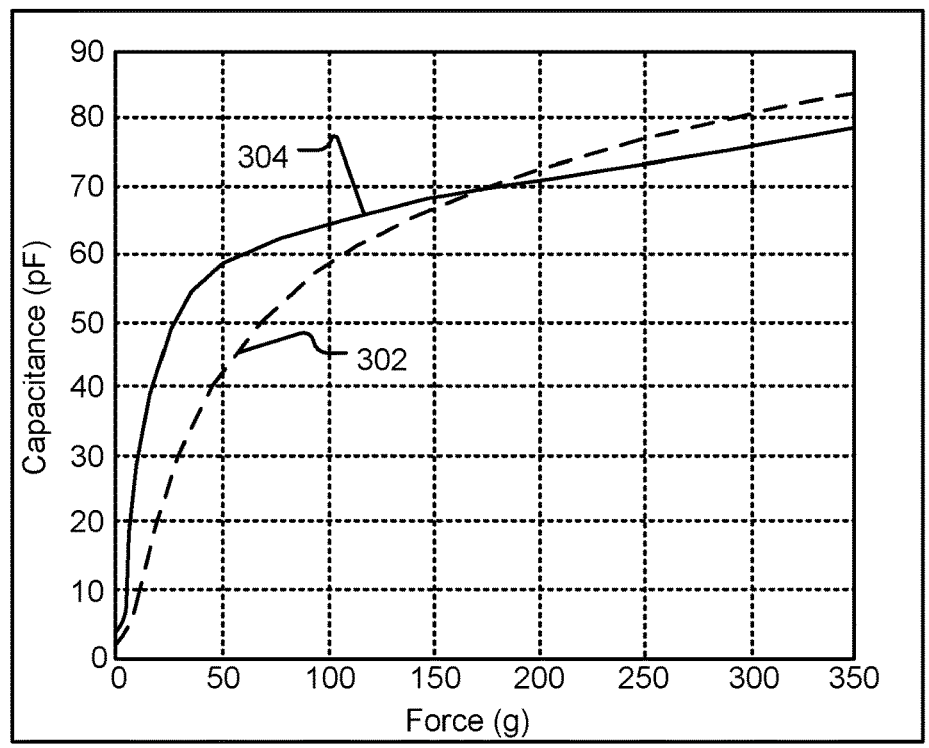
FIG. 3 illustrates an example plot diagram illustrating capacitive responses in example stylus devices.

FIG. 3 illustrates an example plot diagram 300 illustrating capacitive responses in example stylus devices. An x-axis of the plot diagram 300 represents a detected force in grams (g). A y-axis of the plot diagram 300 represents a capacitance in picofarads (pF). A plot 302 represents capacitance as a function of detected force in a stylus device without a force response circuit disclosed herein. A plot 304 represents a capacitance as a function of detected force in a stylus device with a force response circuit disclosed herein. The plot 304 illustrates an increased range of capacitance values use to represent force in a range from about zero-grams to about thirty-grams compared to the plot 302. As such, force detected in those ranges may be more accurately detected/represented. In other words, the plot 304 indicates an increased sensitivity to force detection in lower force ranges. The force response curve is modified (e.g., shaped) by the force response circuit to increase sensitivity in lower force ranges.

In some implementations, the circuit used in a stylus device may be utilized to selectively increase sensitivity in force ranges. For example, different capacitor configurations may be selectively activated or utilized to increase the sensitivity in a range from about 60 grams to about 100 grams. It should be understood that other ranges may be selected.

Figure 4:
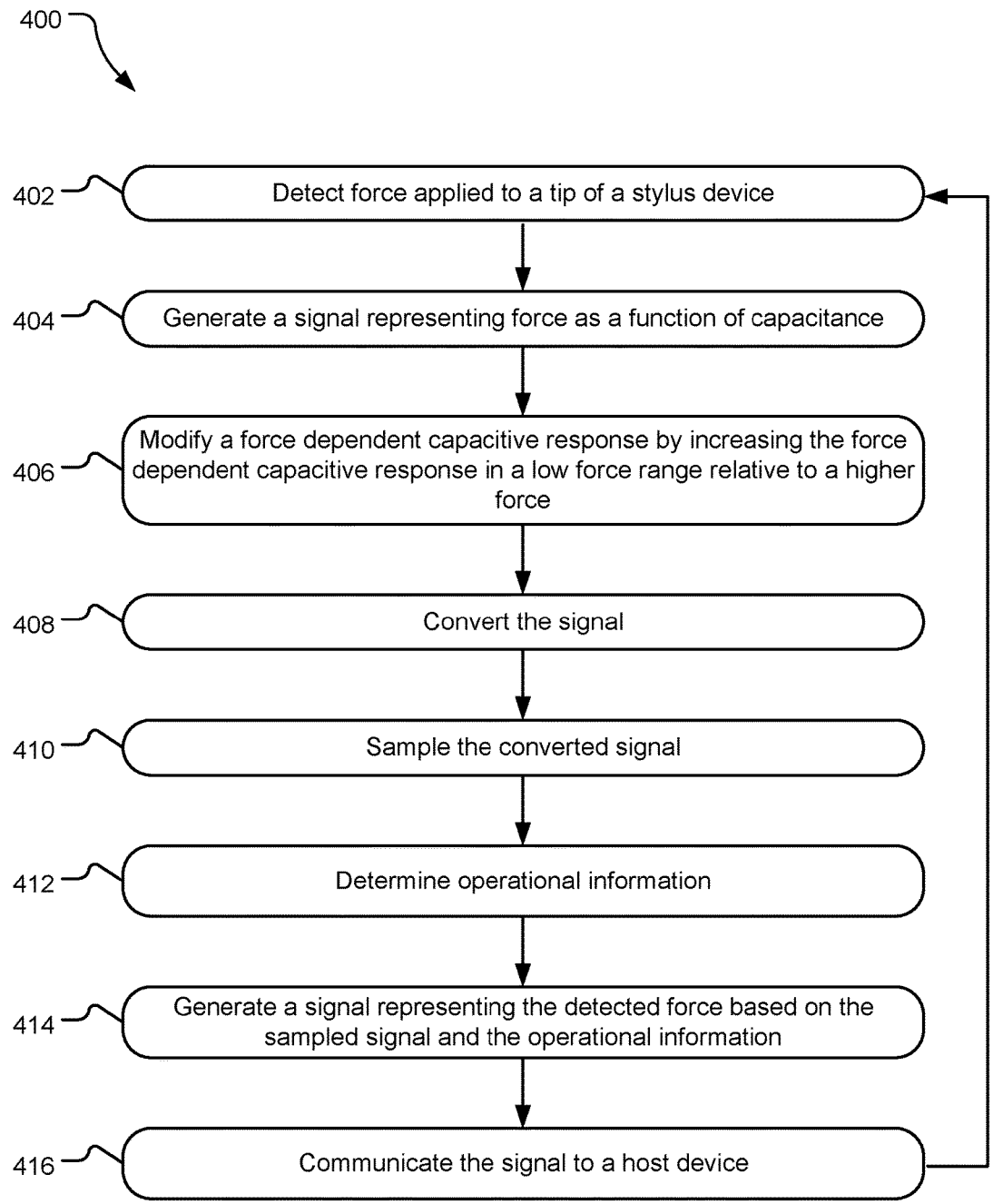
FIG. 4 illustrates example operations for utilizing a stylus device disclosed herein.

FIG. 4 illustrates example operations 400 for utilizing a stylus device disclosed herein. A detecting operation 402 detects force applied to a tip of a stylus device. A generating operation 404 generates a signal representing the detected force as a function of capacitance. The detecting operation 402 and the generating operation 404 may be performed by a capacitive force sensor in the stylus device. A modifying operation 406 modifies a force dependent capacitive response by increasing a force dependent capacitance response in a low force range relative to a higher force range. The modifying operation 406 may be performed by a force response circuit communicatively connected to the capacitive force sensor. In some example implementations, the modifying operation 406 modifies the force dependent capacitive response sensitivity in a sub-force (e.g., 50 to 100 grams) of the overall force range detectable by the stylus device (0 to 500 grams) In some implementations, the force response circuit is included in the capacitive force sensor. In other implementations, the force response circuit is communicatively connected to a signal trace between the capacitive force sensor and post processing components (e.g., analog to digital converter, sampling module, processors, microprocessors, digitizer signal generator).

A converting operation 408 converts the modified response to a digital signal. The converting operation 408 may be performed by an analog to digital converter. A sampling operation 410 samples the converted signal, which may be performed by a sampling module. A determining operation 412 determines any operational information. The operational information may include an operational mode (e.g., writing, erasing, writing utensil, color, etc.), which may be determined based on detected button activation. A generating operation 414 generates an inking signal representing the detected force based on the sampled signal and the determined operational information. The generating operation 414 may be performed by a digitizer signal generator. The digitizer signal generator, sampling module, processors, microprocessor units, analog to digital convertor, force response circuit, and/or the capacitive force sensor may be implemented in a system on chip (SOC), application specific integrated circuit (ASIC), micro-processing unit, etc. A communicating operation 416 communicates the inking signal to a host device. The operations 400 may be continuously or intermittently repeated. In some implementations, the generated inking signal is a digitizer signal which is communicated (e.g., in the communicating operation 416) to a digitizer of the host device. In other implementations, the inking signal is communicated to the host device via BlueTooth, Wi-Fi, etc.

Figure 5:
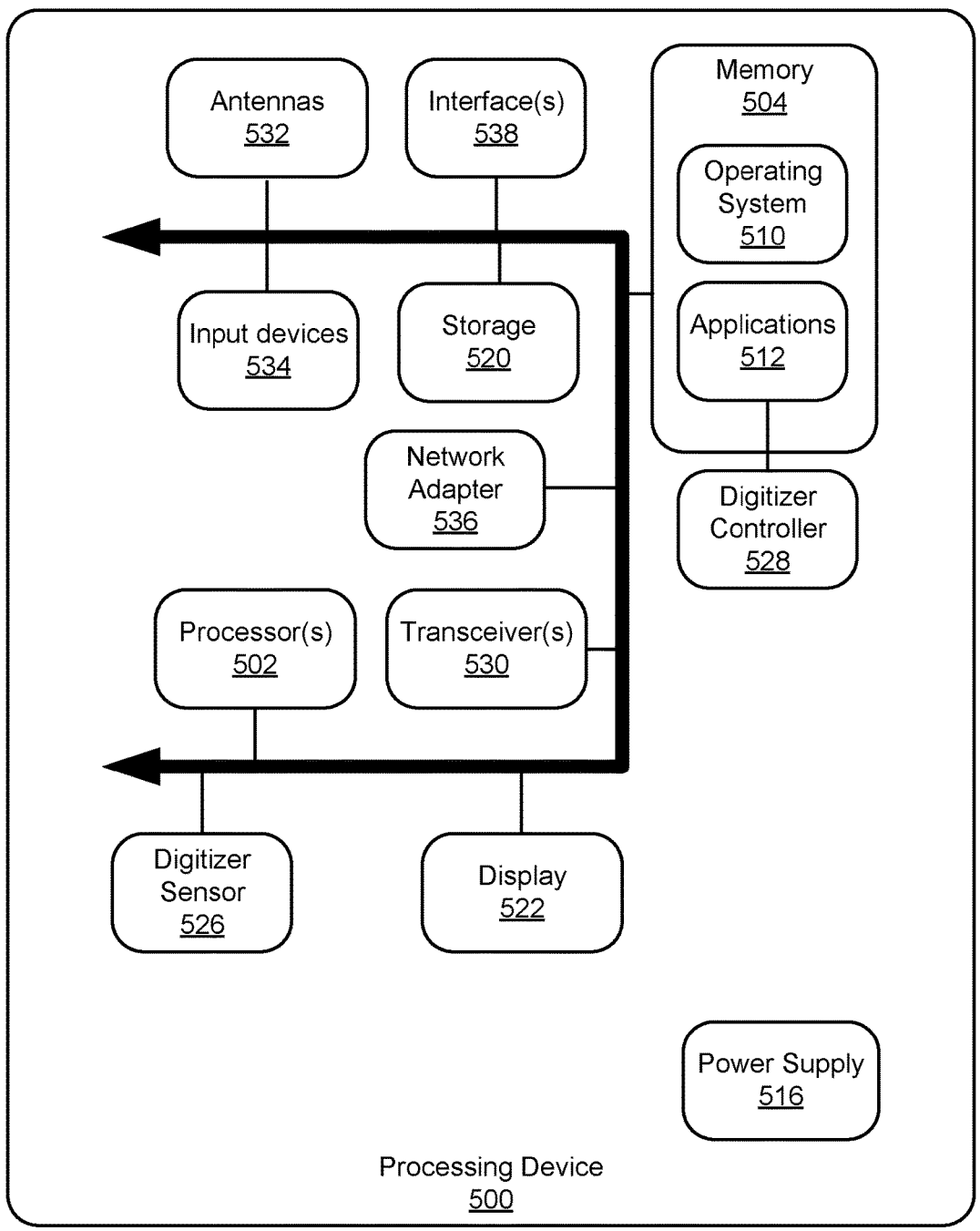
FIG. 5 illustrates an example block diagram of an example processing device.

FIG. 5 illustrates an example block diagram of an example processing device 500. The device 500 may be a client device such as a laptop, mobile device, desktop, tablet, stylus, or a server/cloud device. The device 500 includes one or more processor(s) 502, and a memory 504. The memory 504 generally includes both volatile memory (e.g., RAM) and non-volatile memory (e.g., flash memory). An operating system 510 resides in the memory 504 and is executed by the processor(s) 502.

One or more application programs 512, modules, or segments, such as a drawing application, document editing application, or a digitizer controller 528 are loaded in the memory 504 and/or storage 520 and executed by the processor(s) 502. Data such as communication protocol parameters, stylus identifications, force to drawing weight ratios for stylus writing, etc. may be loaded into memory 504 or storage 520 and may be retrievable by the processor(s) 502 for use by the applications (e.g., the digitizer controller 528), etc. The storage 520 may be local to the device 500 or may be remote and communicatively connected to the device 500 and may include another server.

The device 500 includes a power supply 516, which is powered by one or more batteries or other power sources and which provides power to other components of the device 500. The power supply 516 may also be connected to an external power source that overrides or recharges the built-in batteries or other power sources.

The device 500 may include one or more communication transceivers 530 to provide network connectivity (e.g., mobile phone network, Wi-Fi, BlueTooth) via the one or more antennas 532 to one or more other servers and/or client devices (e.g., mobile devices, desktop computers, or laptop computers). The device 500 includes a digitizer sensor 526 for communicating with one or more stylus devices and determining location and operational modes of the stylus devices. The device 500 may further include a network adapter 536, which is a type of communication device. The device 500 may use the adapter and any other types of communication devices for establishing connections over a wide-area network (WAN) or local-area network (LAN). It should be appreciated that the network connections shown are exemplary and that other communications devices and means for establishing a communications link between the device 500 and other devices may be used.

The device 500 may include one or more input devices 534 such that a user may enter commands and information (e.g., a keyboard or mouse). These and other input devices may be coupled to the server by one or more interfaces 538 such as a serial port interface, parallel port, universal serial bus (USB), etc. The device 500 may further include a display 522 such as a touch screen display.

The device 500 may include a variety of tangible processor-readable storage media and intangible processor-readable communication signals. Tangible processor-readable storage can be embodied by any available media that can be accessed by the device 500 and includes both volatile and nonvolatile storage media, removable and non-removable storage media. Tangible processor-readable storage media excludes intangible communications signals and includes volatile and nonvolatile, removable and non-removable storage media implemented in any method or technology for storage of information such as processor-readable instructions, data structures, program modules or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by the device 500. In contrast to tangible processor-readable storage media, intangible processor-readable communication signals may embody processor-readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

An example stylus device includes a force response circuit configured to modify a force dependent capacitive response in a capacitive force sensor such that the force dependent capacitive response is more sensitive to a detected force in a low force range relative to a higher force range. The force dependent capacitive response is dependent on the detected force applied to a tip of the stylus device. The stylus device further includes an inking circuit communicatively connected to the capacitive force sensor that generates an inking signal for communication to a host device. The generated inking signal is based on the modified force dependent capacitive response and representing the detected force applied to the tip.

An example stylus device of any preceding stylus device further includes the force response circuit including at least two capacitors in series.

An example stylus device of any preceding stylus device further includes the sensitive low force range of the force dependent capacitive response being usable to set an activation force for inking.

An example stylus device of any preceding stylus device includes the force response circuit being configurable to increase the force dependent capacitive response in at least one other force range different from the low force range and the higher force range.

An example stylus device of any preceding stylus device further includes the low force range being from about 0 grams to about 10 grams.

An example stylus device of any preceding stylus device further includes the force response circuit being configurable to increase the force dependent capacitive response in the low force range based on based on a user preference.

An example stylus device of any preceding stylus device further includes the low force range being selected based on the detected force.

An example method includes modifying a force dependent capacitive response in a capacitive force sensor such that the force dependent capacitive response is more sensitive to a detected force in a force sub-range relative to an overall force range detectable by the capacitive force sensor, the force dependent capacitive response being dependent on the detected force applied to a tip of a stylus device; and generating an inking signal for communication to a host device, the generated inking signal being based on the modified force dependent capacitive response and representing the detected force applied to the tip.

Another example method of any preceding method further includes modifying the force dependent capacitive response using one or more capacitors in a force response circuit to increase the force dependent capacitive response sensitivity in the force sub-range relative to the overall force range.

Another example method of any preceding method further includes the signal being modified by a force response circuit including at least two capacitors in series.

Another example method of any preceding method further includes modifying operation determining an activation force for inking in a stylus device.

Another example method of any preceding method further includes the force dependent capacitive response being modified to increase the force dependent capacitive response in at least one other force sub-range different from the force sub-range.

Another example method of any preceding method further includes the force dependent capacitive response being modified by a configurable force response circuit, the force sub-range being based on a user preference.

An example system includes means for modifying a force dependent capacitive response in a capacitive force sensor such that the force dependent capacitive response is more sensitive to a detected force in a force sub-range relative to an overall force range detectable by the capacitive force sensor, the force dependent capacitive response being dependent on the detected force applied to a tip of a stylus device; and generating an inking signal for communication to a host device, the generated inking signal being based on the modified force dependent capacitive response and representing the detected force applied to the tip.

Another example system of any preceding system includes means for modifying the force dependent capacitive response using one or more capacitors in a force response circuit to increase the force dependent capacitive response sensitivity in the force sub-range relative to the overall force range.

Another example system of any preceding system includes means for modifying the signal by the force response circuit supporting at least two capacitors in series.

Another example system of any preceding system includes means for modifying operation determining an activation force for inking in a stylus device.

Another example system of any preceding system includes means for the force dependent capacitive response being modified to increase the force dependent capacitive response in at least one other force sub-range different from the force sub-range.

Another example system of any preceding system includes means for the force dependent capacitive response being modified by a configurable force response circuit, the force sub-range being based on a user preference.

An example system includes a force response circuit configured to modify a force dependent capacitive response in a capacitive force sensor such that the force dependent capacitive response is more sensitive to a detected force in a low force range relative to a higher force range, the force dependent capacitive response being dependent on the detected force applied to a tip of a stylus device; and an inking circuit communicatively connected to the capacitive force sensor that generates an inking signal for communication to a host device, the generated inking signal being based on the modified force dependent capacitive response and representing the detected force applied to the tip.

Another example system of any preceding system further includes the force response circuit including at least two capacitors in series.

Another example system of any preceding system further includes the sensitive low force range of the force dependent capacitive response being usable to set an activation force for inking.

Another example system of any preceding system further includes the force response circuit being configurable to increase the force dependent capacitive response in at least one other force range different from the low force range and the higher force range.

Another example system of any preceding system further includes the force response circuit being configurable to increase the force dependent capacitive response in the low force range during production of the system.

Another example system of any preceding system further includes the force response circuit being configurable to increase the force dependent capacitive response in the low force range based on a user preference.

Another example system of any preceding system further includes the low force range being selected based on the detected force.

The implementations of the invention described herein are implemented as logical steps in one or more computer systems. The logical operations of the present invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the embodiments of the invention described herein are referred to variously as operations, steps, objects, or modules. Furthermore, it should be understood that logical operations may be performed in any order, adding and omitting as desired, unless explicitly claimed otherwise or a specific order is inherently necessitated by the claim language.

The above specification, examples, and data provide a complete description of the structure and use of exemplary embodiments of the invention. Since many implementations of the invention can be made without departing from the spirit and scope of the invention, the invention resides in the claims hereinafter appended. Furthermore, structural features of the different embodiments may be combined in yet another implementation without departing from the recited claims.

What is claimed is:

1. A stylus device comprising:
   a stylus tip;
   a capacitive force sensor having a capacitor and an output connection coupled to the stylus tip, the capacitive force sensor configured to detect a force dependent capacitive response representing force applied to the stylus tip and to output a force dependent capacitive response signal based on the force dependent capacitive response;

a force response electronic circuit including a variable capacitor electrically connected to the output connection of the capacitive force sensor to modify the force dependent capacitive response to yield a modified force dependent capacitive response signal from the capacitive force sensor, such that the modified force dependent capacitive response signal is more sensitive to a detected force in a low force range relative to a higher force range as compared to the force dependent capacitive response signal; and an inking electronic circuit including an analog to digital converter electrically connected to the output connection of the capacitive force sensor and communicatively connected to the force response electronic circuit and configured to generate an inking signal for communication to a host device, the generated inking signal being based on the modified force dependent capacitive response signal.

2. The stylus device of claim 1 wherein the force response electronic circuit further includes at least one capacitor in series with the variable capacitor.

3. The stylus device of claim 1 wherein the low force range of the modified force dependent capacitive response signal is usable to set an activation force for inking.

4. The stylus device of claim 1 wherein the force response electronic circuit is configurable to increase the modified force dependent capacitive response signal as compared to the force dependent capacitive response signal in at least one other force range different from the low force range and the higher force range.

5. The stylus device of claim 1 wherein the low force range is from about 0 grams to about 10 grams.

6. The stylus device of claim 1 wherein the force response electronic circuit is configurable to increase the modified force dependent capacitive response signal in the low force range based on a user preference.

7. The stylus device of claim 1 wherein the low force range is selected based on the detected force.

8. A method comprising:

modifying a force dependent capacitive response signal in a capacitive force sensor including a capacitor and an output connection using a force response electronic circuit including a variable capacitor, the force response electronic circuit electrically coupled to the output connection of the capacitive force sensor to yield a modified force dependent capacitive response signal such that the modified force dependent capacitive response signal is more sensitive to a detected force in a force sub-range relative to an overall force range detectable by the capacitive force sensor compared to the force dependent capacitive response signal, the modified force dependent capacitive response signal being dependent on the detected force applied to a tip of a stylus device; and generating an inking signal with an inking electronic circuit including an analog to digital converter electrically connected to the output connection and communicatively connected to the force response electronic circuitry, the inking signal for communication to a host device, the generated inking signal being based on the modified force dependent capacitive response signal.

9. The method of claim 8 wherein the modifying operation further comprises:

modifying the force dependent capacitive response signal using one or more additional capacitors in the force response electronic circuit to increase sensitivity of the modified force dependent capacitive response signal in the force sub-range relative to the overall force range.

10. The method of claim 8 wherein the force dependent capacitive response signal is modified by the force response electronic circuit including the variable capacitor and at least one or more additional capacitors in series to yield the modified force dependent capacitive response signal.

11. The method of claim 8 wherein the modifying operation determines an activation force for inking in a stylus device.

12. The method of claim 8 wherein the force dependent capacitive response signal is modified to increase the modified force dependent capacitive response signal in at least one other force sub-range different from the force sub-range.

13. The method of claim 8 wherein the force dependent capacitive response signal is modified by a configurable force response electronic circuit, the force sub-range being based on a user preference.

14. A system comprising:

a tip;

a capacitive force sensor having a capacitor and an output connection coupled to the tip, the capacitive force sensor configured to detect a force dependent capacitive response representing force applied to the tip and to output a force dependent capacitive response signal based on the force dependent capacitive response;

a force response electronic circuit including a variable capacitor electrically connected to the output connection of the capacitive force sensor and configured to modify the force dependent capacitive response to yield a modified force dependent capacitive response signal from the capacitive force sensor such that the modified force dependent capacitive response signal is more sensitive to a detected force in a low force range relative to a higher force range as compared to the force dependence capacitive response signal; and an inking electronic circuit including an analog to digital converter electrically connected to the output connection of the capacitive force sensor and communicatively connected to the force response electronic circuit and configured to generate an inking signal for communication to a host device, the generated inking signal being based on the modified force dependent capacitive response signal.

15. The system of claim 14 wherein the force response electronic circuit further includes at least one or more capacitors in series.

16. The system of claim 14 wherein the low force range of the modified force dependent capacitive response signal is usable to set an activation force for inking.

17. The system of claim 14 wherein the force response electronic circuit is configurable to increase the modified force dependent capacitive response signal in at least one other force range different from the low force range and the higher force range.

18. The system of claim 14 wherein the force response electronic circuit is configurable to increase the modified force dependent capacitive response signal in the low force range during production of the system.

19. The system of claim 14 wherein the force response electronic circuit is configurable to increase the modified force dependent capacitive response signal in the low force range based on a user preference.

20. The system of claim 14 wherein the low force range is selected based on the detected force.

* * * * *